Patented Nov. 23, 1926.

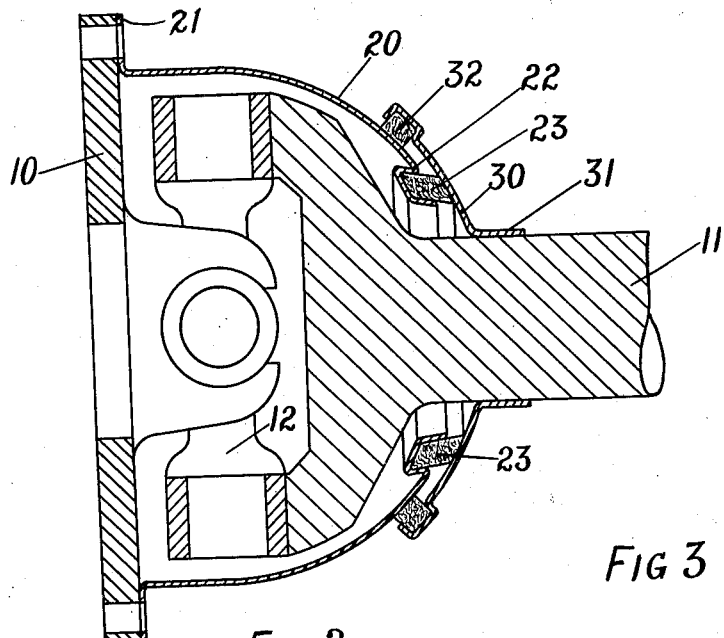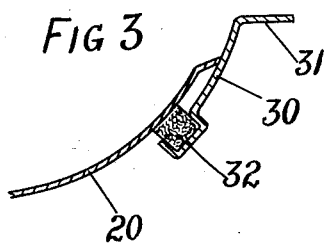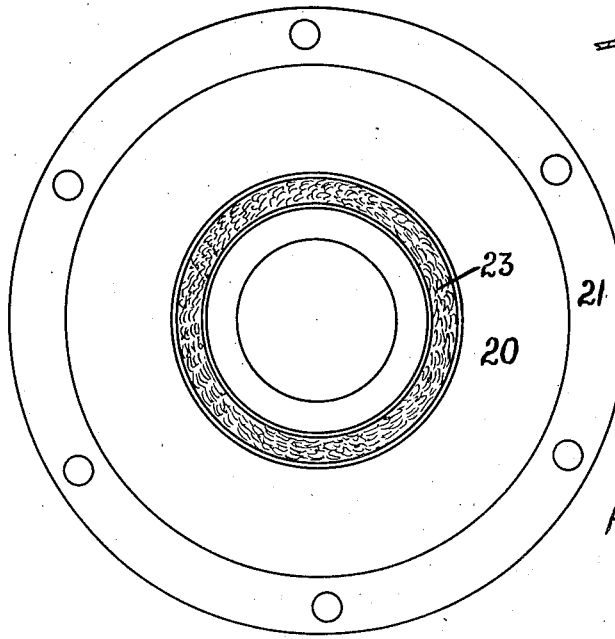

1,607,616

UNITED STATES PATENT OFFICE.

ROBERT REED GRENINGER, OF ROCHESTER, NEW YORK.

CASING FOR UNIVERSAL JOINTS.

Application filed November 12, 1925. Serial No. 68,653.

My invention relates to casings for encased universal joints and has for its object to produce a casing that will retain the lubricant and thereby prevent the joint from running dry in service.

A further object is to produce a packing interposed in such a manner between an inner and outer casing that the lubricant will be kept scraped away from the inside surface of the outer casing and by centrifugal force be thrown back into the inner casing.

I have found that in the universal joints constructed after the manner disclosed in U. S. Patent 958,023 granted May 17, 1910, to C. W. Spicer that the lubricant enters between the inner and outer casing and is forced under the packing by centrifugal force. In endeavoring to overcome this objectional feature I have discovered that if the inside casing was constructed so that the lubricant is wiped off the inside of the outside casing centrifugal force would tend to throw the grease, thus wiped off, back into the inner casing and thereby prevent it from being forced out under the packing.

The foregoing and other features of my invention will now be described in connection with the accompanying drawing forming parts of this disclosure in which I have represented my casing in its preferred form, after which I shall point out more particularly in the claim those features which I believe to be new and of my own invention.

In the drawings accompanying and forming part of this specification:

Figure 1 is a longitudinal section of my casing applied to a standard universal joint.

Figure 2 is a view looking from the right with the outside casing removed.

Figure 3 is a part section of a modified form of my invention.

In the drawings I have illustrated a standard universal joint comprising a driving member 10, a driven member 11, connected together for universal movement through the journal 12. To encase the joint, I provide an inner casing 20 and an outer casing 30. The inner casing 20 as shown is provided with a flange 21 for convenience in attaching to the driving member 10 and the outer casing is provided with a sleeve 31 for mounting at the driven member 11. The outer casing is also provided with a packing 32 which rides on the outside surface of the inner casing 20.

The description so far is common to the universal joint disclosed in the United States Patent heretofore specifically mentioned.

The inner edge of my inner casing 20 may be flared frusto conically as shown in Figure 3 so that it rides upon the inside of the outside casing as shown or it may be provided with an annular retaining frusto conical ring 22 in which a ring of packing 23 is inserted. It will be observed by referring to Figure 1 that this packing scrapes against the inside of the outside ring and is set at an angle to the longitudinal axis of the joint, the smaller end of the frusto conical portion being away from the joint member. The object of this is to present a scraping means to wipe the inside of the outer casing free from lubricant and as the lubricant piles up on the angular scraper, centrifugal forces leads it back again into the inner casing.

I wish it distinctly understood that my improvement in casing for universal joints herein described and illustrated is in the form in which I desire to construct it and that changes or variations may be made as may be convenient or desirable without departing from the salient features of my invention and I therefore intrust the following claims to cover such modifications as naturally fall within the lines of the invention.

I claim:

1. A casing for universal joint comprising a partly spherical casing provided with an annular flange set at an angle to the longitudinal axis the smallest diameter thereof being furthest away from the joint, an outer casing provided with an annular flange containing a packing, said packing adapted to ride on the outside of the inside casing, a packing adapted to be held within the flange of the inside casing and contact with the inside of the outside casing at an angle to the longitudinal axis, said angle converging away from the joint whereby the lubricant is wiped off the outer casing and led away from the leak point back into the inner casing.

2. A casing for universal joints comprising a partly spherical casing provided with a frusto conical opening therein the smallest diameter thereof being furthest away from the joint, an outer casing adapted to close the opening in the inner casing and provided with an annular packing ring, adapted to contact with the outside of the partly spherical portion of the inside casing, the small end of the said frusto conical portion contacting with the inner side of the outer casing whereby the lubricant is wiped off the outer casing and led away from the leak point back into the inner casing.

3. A casing for universal joints comprising a partly spherical casing provided with a frusto conical opening therein the smallest diameter thereof being furthest away from the joint, and adapted to hold a frusto conical ring of packing, an outer casing adapted to close the opening in the inner casing and provided with an annular packing ring adapted to ride on the partly spherical portion of the inside casing, said frusto conical ring like packing adapted to ride on the inside of the outside casing whereby the lubricant is wiped off the outer casing and led away from the leak point back into the inner casing.

4. In an incased universal joint provided with an inner and outer casing, a packing ring interposed between the casings set at an angle in the inner casing to the horizontal axis thereof so that the packing will scrape the lubricant off the outer casing and be lead away from the leak point back into the inner casing.

5. In an incased universal joint provided with an inner and outer casing, the inner casing contacting with the outer casing at an angle to the horizontal axis so that the lubricant will be scraped off the inside surface of the outer casing and be led away from the leak point back into the inner casing.

In witness whereof I have affixed my signature.

ROBERT REED GRENINGER.